United States Patent
McClard

(10) Patent No.: US 9,644,336 B2
(45) Date of Patent: May 9, 2017

(54) METHOD AND APPARATUS FOR STABILIZING AN ANIMAL TRAP

(71) Applicant: Travis Michael McClard, Lawson, MO (US)

(72) Inventor: Travis Michael McClard, Lawson, MO (US)

(\*) Notice: Subject to any disclaimer, the term of this patent is extended or adjusted under 35 U.S.C. 154(b) by 0 days.

(21) Appl. No.: 14/716,468

(22) Filed: May 19, 2015

(65) Prior Publication Data

US 2015/0345100 A1    Dec. 3, 2015

Related U.S. Application Data

(60) Provisional application No. 62/005,274, filed on May 30, 2014.

(51) Int. Cl.
| | | |
|---|---|---|
| *A01M 23/00* | (2006.01) | |
| *E02D 5/80* | (2006.01) | |
| *A01M 1/10* | (2006.01) | |
| *A01M 23/26* | (2006.01) | |
| *A45F 3/44* | (2006.01) | |
| *A47F 5/00* | (2006.01) | |
| *E04G 25/00* | (2006.01) | |
| *F16M 13/00* | (2006.01) | |
| *B65D 63/00* | (2006.01) | |
| *A47B 97/00* | (2006.01) | |
| *E04H 15/62* | (2006.01) | |

(Continued)

(52) U.S. Cl.
CPC .............. *E02D 5/80* (2013.01); *A01M 23/245* (2013.01); *A01M 23/24* (2013.01); *A01M 23/26* (2013.01); *A01M 23/28* (2013.01); *E04C 5/12* (2013.01); *E04H 15/62* (2013.01); *E04H 17/22* (2013.01)

(58) Field of Classification Search
CPC ..... E04H 15/62; E04H 12/2215; E04H 15/64; E04H 12/2223; E04H 17/22; A45F 3/44; A45B 2023/0012; A01K 1/04; E04C 5/12; E21D 20/00; E21D 21/00; F16B 13/08; E02D 5/80; A01M 23/24; A01M 23/26; A01M 23/265; A01M 23/28; A01M 23/245
USPC ... 248/156, 545, 530, 87, 499, 500, 50, 508, 248/354.4, 154; 135/118; 43/96, 58, 88, 43/90–95; 52/155, 156, 153, 157; 114/293, 294
See application file for complete search history.

(56) References Cited

U.S. PATENT DOCUMENTS

| 1,309,036 A | 7/1919 | Knight | |
|---|---|---|---|
| 1,350,964 A * | 8/1920 | Friel | ............................... 52/707 |

(Continued)

*Primary Examiner* — Brian Mattei
*Assistant Examiner* — Taylor Morris
(74) *Attorney, Agent, or Firm* — Erickson Kernell IP, LLC

(57) ABSTRACT

The present invention is directed to one or more anchors that can be used to stabilize various types of animal traps to the ground. The invention comprises a clamping structure having at least two holes formed therein. The holes are axially aligned and formed in the top and bottom members of the structure. The invention further comprises a stake for anchoring the invention and trap to the ground. The clamping structure is designed to engage an edge or flange of an animal trap by positioning the flange in a groove in the structure and securing the structure to the flange using a threaded fastener such as a set screw. A threaded stake may be secured to a flange of the trap to anchor and stabilize the trap on the ground.

7 Claims, 5 Drawing Sheets

(51) Int. Cl.
*A01M 23/28* (2006.01)
*E04H 17/22* (2006.01)
*E04C 5/12* (2006.01)
*A01M 23/24* (2006.01)

(56) References Cited

U.S. PATENT DOCUMENTS

| | | | | |
|---|---|---|---|---|
| 2,145,619 | A | * | 1/1939 | Brown ................ 182/107 |
| 2,388,287 | A | * | 11/1945 | Richardson ............ 248/188.91 |
| 2,471,804 | A | | 5/1949 | Wheeler |
| 2,583,749 | A | | 1/1952 | Roberts |
| 2,694,538 | A | * | 11/1954 | Consolo ............... A01K 97/10 |
| | | | | 248/182.1 |
| 2,812,743 | A | * | 11/1957 | Dustin ................. A01K 1/04 |
| | | | | 119/780 |
| 2,899,769 | A | * | 8/1959 | Niles .................... 43/21.2 |
| 2,908,099 | A | * | 10/1959 | Burke ................... A01K 97/11 |
| | | | | 43/16 |
| 2,918,748 | A | | 12/1959 | Oesch |
| 3,127,150 | A | * | 3/1964 | Dunston ............... 254/98 |
| 3,387,814 | A | * | 6/1968 | Fischer ................ 248/507 |
| 3,606,231 | A | * | 9/1971 | Kilborn ................ 248/354.3 |
| 4,020,585 | A | * | 5/1977 | Benschoter ........... A01M 23/24 |
| | | | | 43/96 |
| 4,144,843 | A | | 3/1979 | Schrougham |
| 4,223,492 | A | * | 9/1980 | St. Clair ............... E02D 5/80 |
| | | | | 52/157 |
| 4,226,042 | A | | 10/1980 | Gilbert |
| 4,258,514 | A | * | 3/1981 | St. Clair ............... E04B 1/343 |
| | | | | 135/116 |
| 4,272,907 | A | * | 6/1981 | Skapura ............... A01M 23/26 |
| | | | | 43/92 |
| 4,308,683 | A | | 1/1982 | Lee |
| 4,315,387 | A | | 2/1982 | Lee et al. |
| 4,549,367 | A | * | 10/1985 | Jones, Sr. ............. A01M 23/26 |
| | | | | 43/88 |
| 4,650,146 | A | * | 3/1987 | Duke ................... A01K 97/10 |
| | | | | 248/129 |
| 4,831,798 | A | | 5/1989 | Otteson |
| D318,897 | S | | 8/1991 | Russell |
| 5,181,335 | A | * | 1/1993 | Todd .................... 40/606.13 |
| 5,187,892 | A | * | 2/1993 | Gutierrez .............. 43/21.2 |
| 5,230,187 | A | * | 7/1993 | Reimann ............... 52/102 |
| 5,492,294 | A | * | 2/1996 | Haeussler ............. 248/229.1 |
| 5,515,656 | A | | 5/1996 | Mihalich |
| 5,553,975 | A | * | 9/1996 | Elkins .................. 405/184.4 |
| 5,621,976 | A | * | 4/1997 | Ochsenbine .......... 33/339 |
| 5,987,811 | A | | 11/1999 | Wiesener et al. |
| 6,502,346 | B1 | | 1/2003 | Jokinen |
| 6,536,737 | B1 | * | 3/2003 | Davis ................... E04G 17/14 |
| | | | | 249/210 |
| 6,910,299 | B2 | * | 6/2005 | Butera .................. A01M 23/26 |
| | | | | 43/88 |
| 7,281,349 | B1 | | 10/2007 | Bolstad |
| 7,779,581 | B2 | * | 8/2010 | Flaherty ............... E01C 5/20 |
| | | | | 116/205 |

* cited by examiner

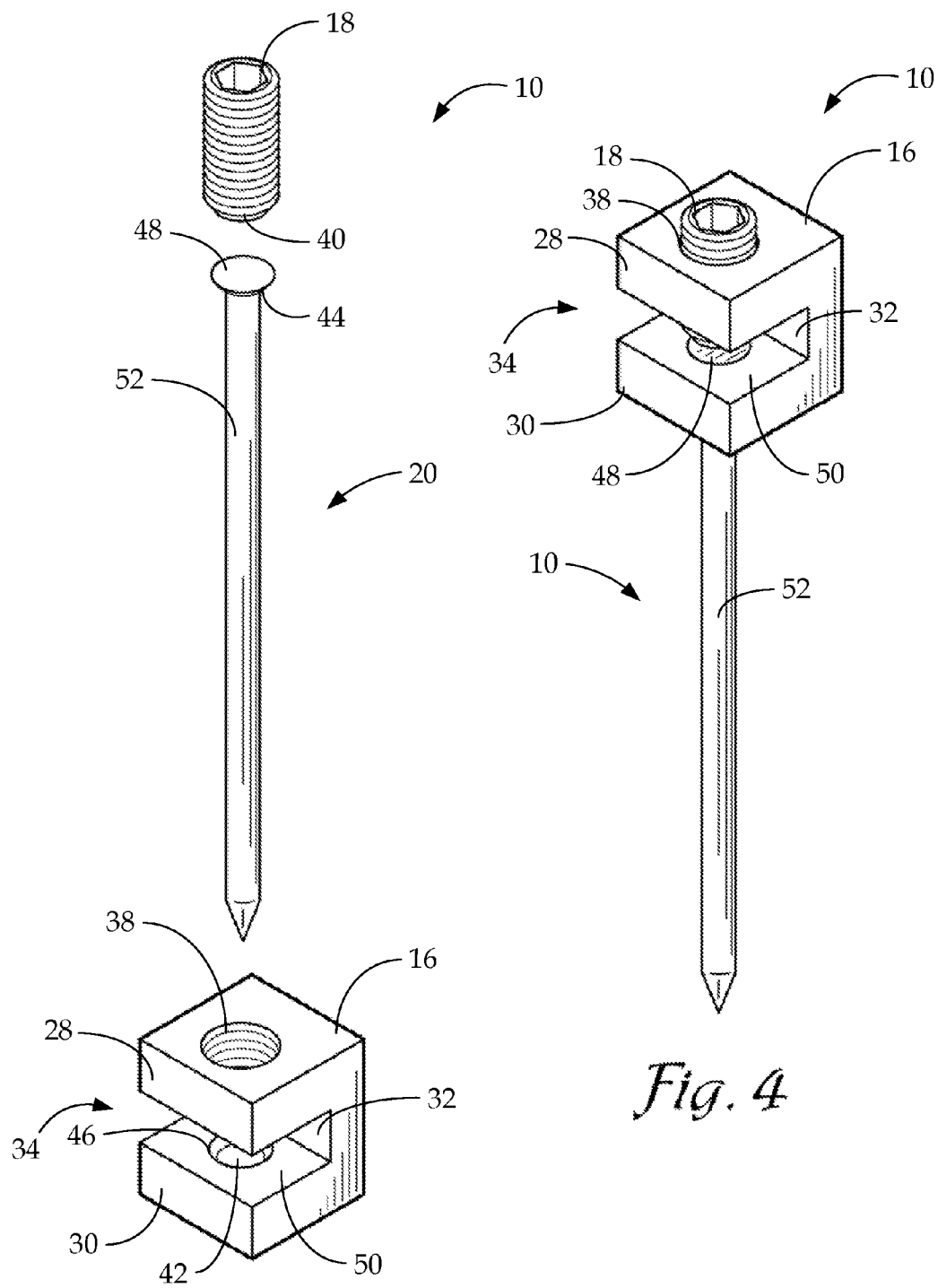

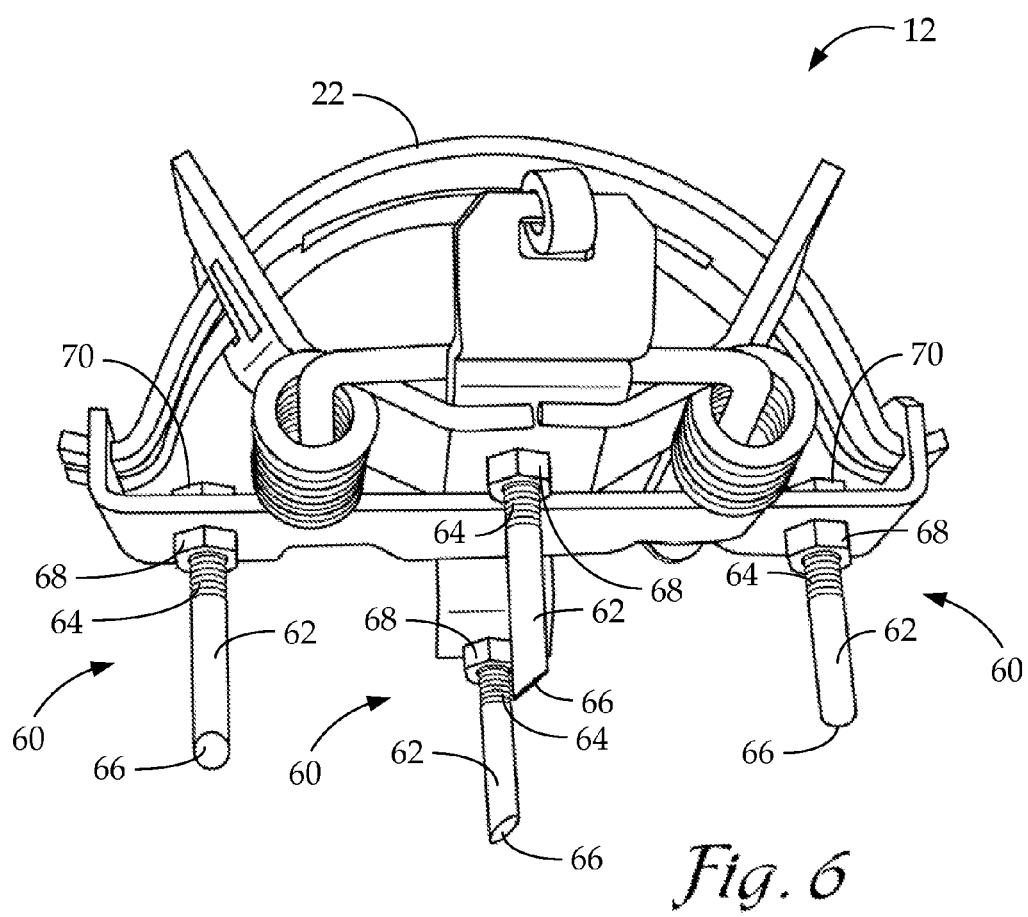

METHOD AND APPARATUS FOR STABILIZING AN ANIMAL TRAP

CROSS-REFERENCE TO RELATED APPLICATION

This application claims the benefit of provisional application Ser. No. 62/005,274, filed on May 30, 2014, entitled METHOD AND APPARATUS FOR STABILIZING AN ANIMAL TRAP.

FIELD

This invention relates to stabilizers for animal traps, and more particularly, to a method and apparatus for stabilizing various types of animal traps.

BACKGROUND

Animal traps are commonly used as a passive means of catching animals in their natural environment. Traps are most effective when they are inconspicuously positioned on the ground near the path of the animal being sought. A trap is usually anchored or tethered to a fixed object to reduce the chance that the trap will be moved and lost. If a trap is not anchored or tethered, a trapped animal may drag the trap to a remote location resulting in loss of the trap and escape of the animal.

A problem with these traps is that they may not be stable when set. Although care may be taken to pack dirt around the trap to stabilize the trap, in cold weather, when the dirt is frozen, it doesn't pack well. Further, if the dirt shrinks as it dries, expands when it gets wet, or thaws, the dirt around the trap may become unstable. If a trap is not stable when it is set, an animal may feel the trap move if it steps on an edge of the trap. If the trap moves, even slightly, the animal may avoid the trap, or may dig up the trap. Some animals, such as coyotes may then seek out and dig up other traps with the same bait scent.

When setting a trap, dirt must be tightly packed around the jaws of the trap to ensure it doesn't move even the slightest. When ambient temperatures are above freezing the dirt packs quite well around the jaws to help with stability. The problem with stabilizing a trap with dirt is that once temperatures fall below freezing the dirt freezes the trap down, not allowing it to fire. Thus care must be taken when setting the trap to prevent it from rocking, shifting or moving in the trap bed, which significantly increases the time spent at each location attempting to prevent movement. A stable trap is easily the most important step in the capturing of game. Poor scent control fades away within a day, but an unstable trap will surely result in exposed, useless sets.

SUMMARY

The present invention is directed to a method and apparatus to stabilize a trap utilizing anchors that can be secured to various types of animal traps to the ground. The anchor comprises a clamping structure having an upper member and a lower member, the upper member having a first hole formed therein and the lower member having a second hole formed therein. A threaded fastener is placed in the first hole and a stake is positioned in the second hole. The clamping structure is designed to engage an edge or flange of an animal trap by positioning the flange in a groove in the structure and securing the structure to the flange using the threaded fastener. The stakes are driven into the ground to stabilize the animal trap.

BRIEF DESCRIPTION OF THE DRAWINGS

FIG. 3 is an exploded perspective view of the animal trap anchor in FIG. 4;

FIG. 4 is a perspective view of an animal trap anchor;

FIG. 6 is a perspective view of a third embodiment of the present invention.

DETAILED DESCRIPTION

Figure 1:
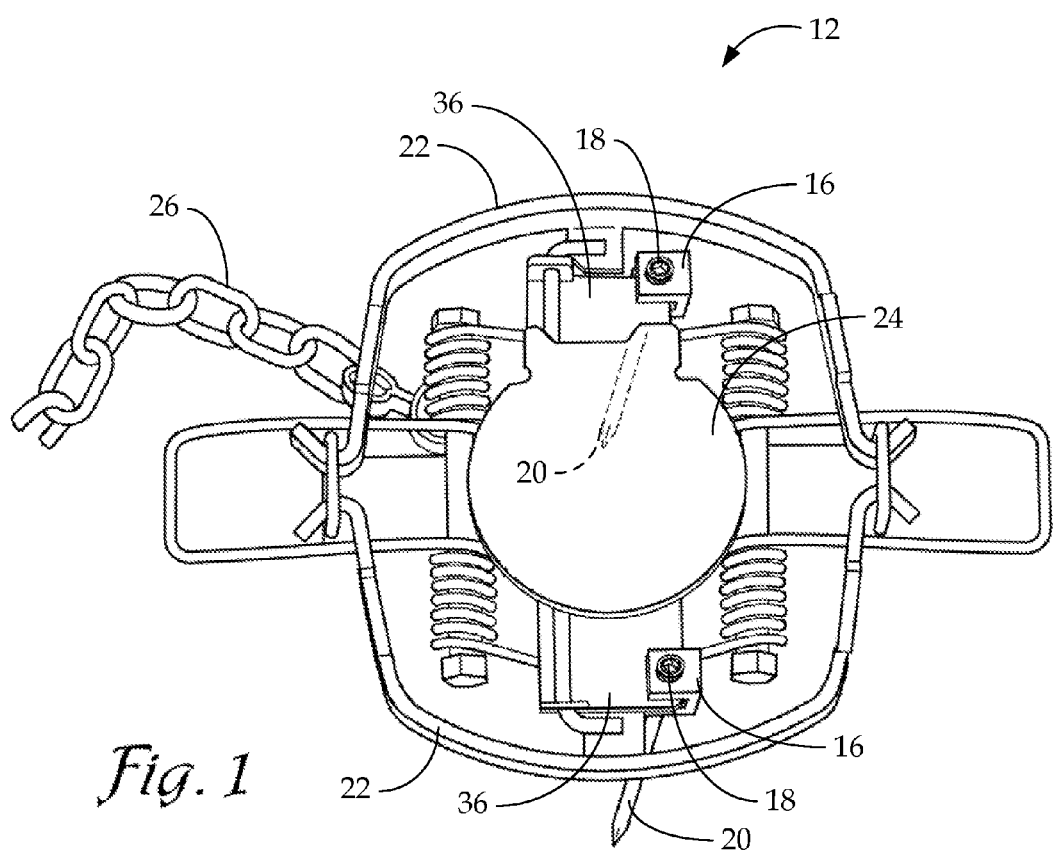
FIG. 1 is a top perspective view of an open or disengaged animal trap having two anchors clamped to the base of the trap.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology may be used in the following description for convenience in reference only and will not be limiting. For example, the words "upwardly," "downwardly," "rightwardly," "leftwardly," "upper," and "lower" may refer to an installed position (as shown in the drawings) of the item to which the reference is made. The words "inwardly" and "outwardly" may refer to directions toward and away from, respectively, the geometric center of the embodiment being described and designated parts thereof. Said terminology may include the words specifically mentioned, derivatives thereof and words of a similar import.

Referring initially to FIGS. 1-4, an anchor 10 for stabilizing various types of animal traps 12 to the ground 14 is illustrated. Anchor 10 includes a clamping structure 16 that is removably securable to an animal trap 12. Clamping structure 16 may be secured to trap 12 using a set screw 18 or other fastener. Clamping structure 16 includes a stake 20, which is driven into the ground 14 to stabilize the trap 12. The anchor 10 has the unique ability to stabilize almost any type of animal trap to the ground so long as the trap has a surface to which the clamping structure 16 may be attached.

Figure 2:
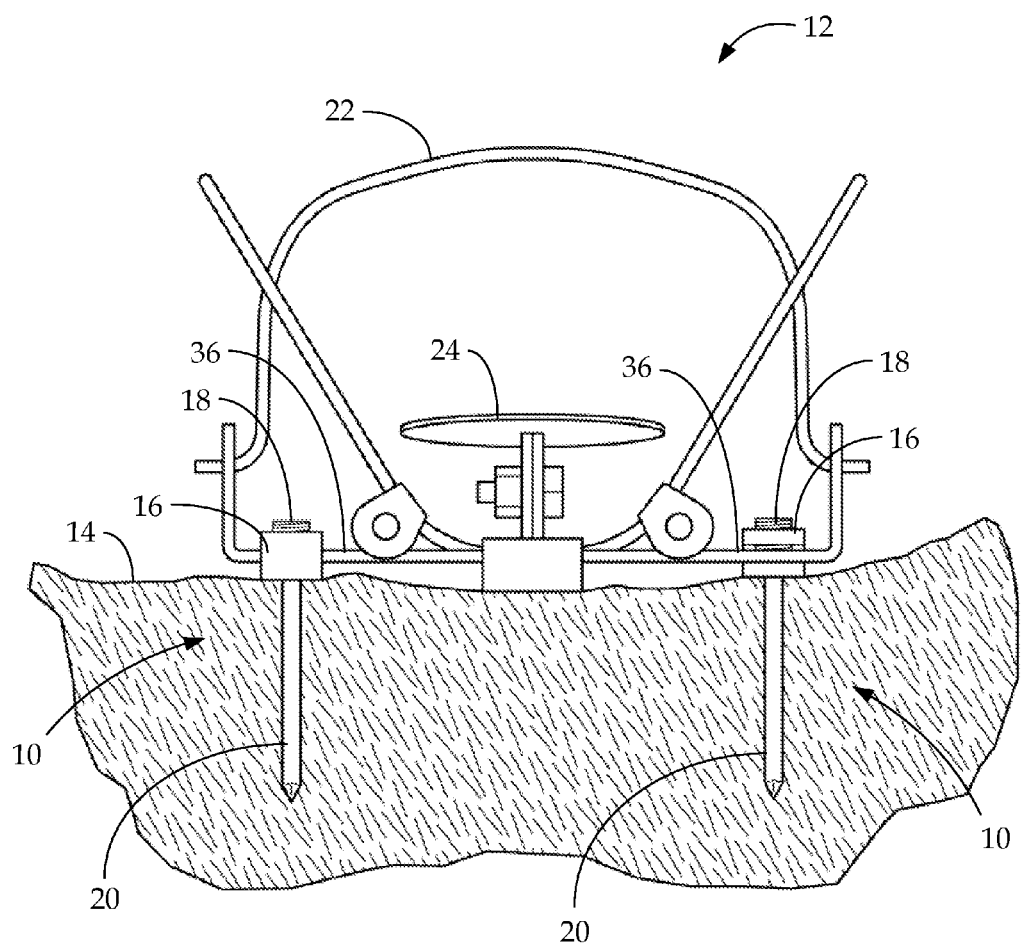
FIG. 2 is a cross-sectional view of a closed or engaged animal trap having two anchors clamped to the base of the trap.

Anchor 10 may be used with a foothold or leghold type animal trap 12. The trap 12 has opposing steel jaws 22 that are spring loaded and activated when the animal steps on pan 24 of the trap 12. The jaws 22 close upwardly, as illustrated in FIG. 2, to hold the leg of the animal to prevent escape. Also shown is a chain tether 26 that may be attached to a stake driven into the ground for securing the trap 12 when an animal has been caught. It is understood that anchor 10 can be used with various types of animal traps and the leghold trap shown herein is for illustrative purposes only.

Clamping structure 16 is generally C-shaped and has upper and lower members 28 and 30 attached to and extending from a back wall 32. Structure 16 forms a groove 34 between the upper and lower members 28 and 30 for receiving an edge or flange 36 of a trap 12. The height of groove 34, which is the distance between members 28 and 30, may vary depending on the thickness of flange 36 but a typical height is approximately one-quarter of an inch. The depth of groove 34, which is the distance from the front edges of members 28 and 30 to the back wall 32, may also vary depending on the size of flange 36. A typical depth of groove 34 is approximately three-quarters of an inch. When clamping structure 25 is fully engaged with trap 12, flange 36 extends into groove 34 all the way to back wall 32. It is foreseen that clamping structure 16 may be many different shapes, sizes and configurations as long as the structure has some form of upper and lower members 28 and 30 for receiving a flange 36 therebetween. For example, members 28 and 30 may be movable to facilitate various thicknesses of flange 36 or extendable and retractable to create different depths for groove 34.

Upper member 28 has a threaded aperture 38 formed therein for receiving the threaded fastener or set screw 18. Set screw 18 is a cylindrically-shaped threaded fastener with a tapered lower end 40 which is used to engage flange 36 to secure anchor 10 to trap 12. Set screw 18 may use various types of driving mechanisms including a hex socket or cap, Phillips head, flat head or any other design that allows sufficient torque to be applied to the screw 18. It is foreseen that anchor 10 may be used without a set screw 18 if the upper and lower members 28 and 30 were configured to be adjustable so as to grip flange 36 in a jaw- or clamp-like fashion.

Lower member 30 has a chamfered or countersunk aperture 42 that is axially aligned with threaded aperture 38. Threaded aperture 38 is sized to allow unrestricted passage of stake 20 therethrough. Countersunk aperture 42 is sized to retain the head 44 of stake 20 within the countersink 46. When head 44 is retained within countersink 46, the top 48 of the head 44 is flush or slightly above the upper surface 50 of the lower member 30 and the shank 52 of stake 20 extends downwardly through aperture 42. Head 44 of stake 20 may have a generally inverted cone shape to match the shape of the countersink 46.

To use anchor 10, the stake 20 is routed through threaded aperture 38 and into countersunk hole 42 thus slidably mounting the clamping structure 16 on stake 20. The clamping structure 16 is secured to the trap 12 by sliding the flange 36 into the groove 34 all the way to the back wall 32. The set screw 18 is tightened against the flange 36 to secure anchor 10 to the trap 12. Two or more anchors 10 may be secured to the trap 12. The stake 20 is driven into the ground at the desired location for the trap 12.

When setting the trap 12, a shallow hole or trap bed may be dug in the dirt. The stakes 20 are driven into the ground until the bottom of the trap is flush with the bottom of the hole in the ground. Dirt may be packed around the base of the trap 12 to help stabilize the trap. The stakes 20 prevent the trap 12 from rocking, shifting or moving in the trap bed, even when not packed with dirt. The trap 12 may then be covered with leaves, weeds, or other natural camouflage to hide the trap 12.

During long periods of sub-freezing temperatures, predators tend to utilize frozen creeks as means of easy travel. When these waterways are covered with a few inches of snow, the anchor 10 may be used to stabilize the trap 12 to the ice. Holes may be drilled in the ice for receiving the stakes 20 to stabilize the trap 12 to the ice. The trap 12 may then be covered with snow. There is no better way to stabilize a trap to a solid slick surface than this. This is revolutionary for the trapping industry to be able to make sets now in a location of such high demand for travel. Every animal in the woods uses frozen creeks to travel rather than fighting the thick underbrush of the woods.

Figure 5:
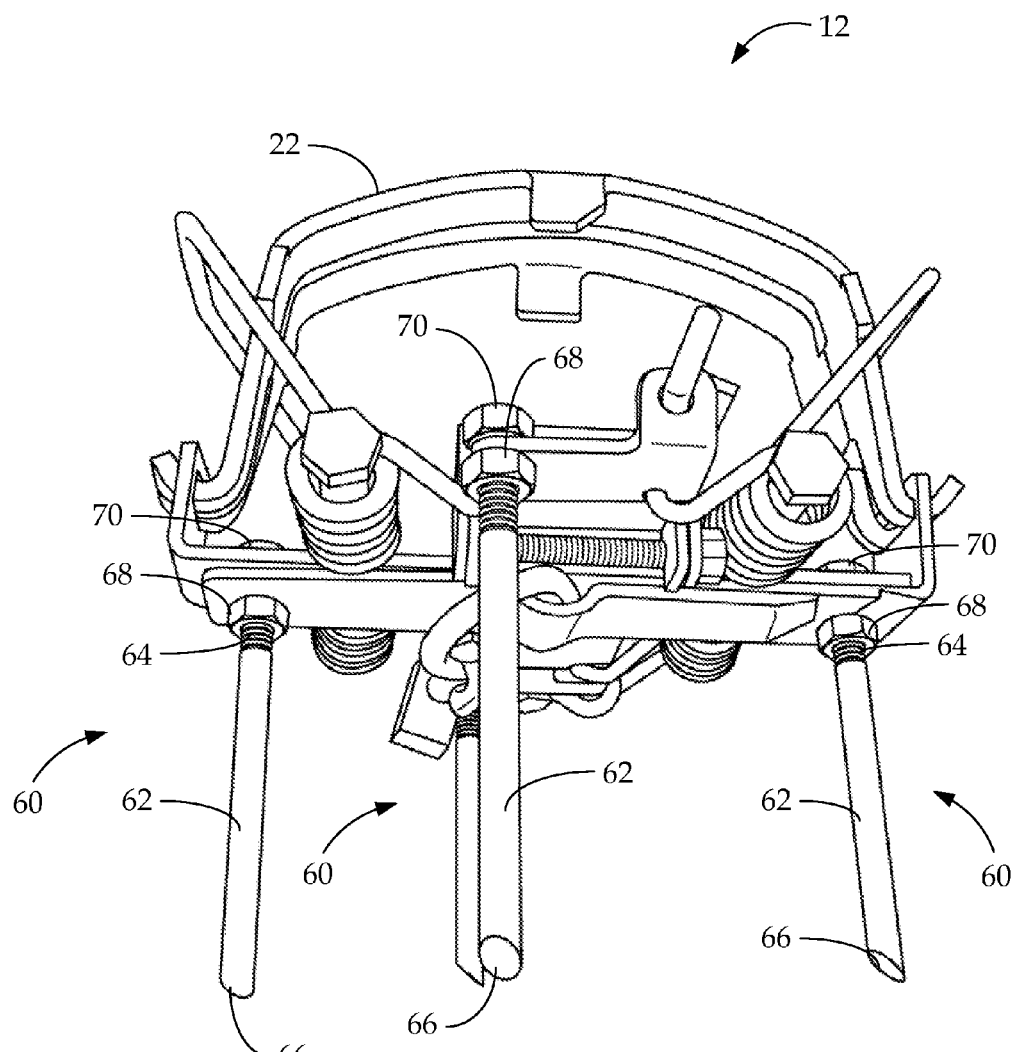
FIG. 5 is a perspective view of a second embodiment of the present invention.

Referring to FIG. 5, another embodiment of a trap anchor is indicated by reference numeral 60. Trap anchor 60 includes one or more spikes 62, each with a treaded end 64 and a tip 66 to be driven into the ground. The treaded end 64 of the spike 62 may be secured to the trap 12 through apertures in the trap 12. A lower nut 68 is adjusted to allow a sufficient length of threaded end 64 to extend through an aperture to the upper side of the trap 12 to be engaged by an upper nut 70. The lower 68 and upper 70 nuts are tightened to secure the spike 62 to the trap 12. The apertures for receiving the spikes 62 may be drilled through parts of the trap 12 at any desired location, or may be presented by removing an existing bolt and nut on the trap 12. One or ordinary skill in the art will readily identify the desired location of the spikes 62 and mounting preference. The spikes 62 may be made of quarter-inch steel, aluminum, brass or other metal rod of sufficient strength to be driven into the ground and anchor the trap 12. The spikes 62 may be two to three inches long for soft dirt, or may be one inch long (as shown in FIG. 6) for hard or frozen ground, for example. The one or more spikes 62 may be permanently secured to the trap 12 by welding the spikes to the trap flanges 36.

It is to be understood that while certain now preferred forms of this invention have been illustrated and described, it is not limited thereto except insofar as such limitations are included in the following claims.

Having thus described the invention, what is claimed as new and desired to be secure by this Patent is as follows:

1. An animal trap comprising:
   a foothold animal trap haying a flange, a pair of opposing jaws pivotally mounted to said flange, a pair of springs coupled to said pair of opposing jaws to pivot sad pair of jaws from an open position to a dosed position, a pan coupled to said pair of jaws to releasably secure said steel jaws in an open position;
   a unitary clamp for receiving a flange of said foothold animal trap, said unitary clamp having an upper member and a lower member, said upper member having a first aperture formed therein and said lower member having a second aperture formed therein;
   a threaded fastener received in said first aperture, said threaded fastener engaging said flange of said foothold animal trap; and a stake received and retained in said second aperture, said stake extending away from said flange and downwardly from a bottom of said foothold animal trap;
   wherein said stake is configured to be driven into the ground to stabilize said foothold animal trap preventing the animal trap from rocking, shifting or moving in a trap bed when encountered by an animal; and
   wherein said first aperture and said second aperture are axially aligned.

2. A stabilized animal trap comprising:
   a leghold animal trap having a flange, a pair of opposing jaws pivotally mounted to said flange, a pair of springs coupled to said pair of opposing jaws to pivot said pair of jaws from an open position to a closed position, a pan coupled to said pair of jaws to releasably secure said jaws in an open position;

a unitary clamping structure for receiving a flange of said stabilized animal trap, said clamping structure having a groove formed therein;
a threaded fastener releasably securing said flange of said stabilized animal trap in said groove; and
a stake secured to said clamping structure and extending from a bottom of said stabilized animal trap;
wherein said stake is configured to be driven into the ground to stabilize said stabilized animal trap preventing said stabilized animal trap from rocking, shifting or moving in a trap bed when encountered by an animal.

3. The stabilized animal trap of claim 2 wherein said clamping structure includes a first aperture and a second aperture axially aligned with said first aperture, wherein said stake is retained and secured in said second aperture.

4. The stabilized animal trap of claim 3 wherein said second aperture is countersunk.

5. The stabilized animal trap of claim 4 wherein said stake includes a head, said head received in said countersink formed in said second aperture.

6. An animal trap comprising:
a foothold animal trap having a flange, a pair of opposing jaws pivotally mounted to said flange, a pair of springs coupled to said pair of opposing jaws to pivot said pair of jaws from an open position to a dosed position, a pan coupled to said pair of jaws to releasabiy secure said steel jaws in an open position;
a unitary clamp for receiving a flange of said foothold animal trap, said unitary clamp having an upper member and a lower member, said upper member having a first aperture formed therein and said lower member having a second aperture formed therein;
a threaded fastener received in said first aperture, said threaded fastener engaging said flange of said foothold animal trap; and a stake received and retained in said second aperture, said stake extending away from said flange and downwardly from a bottom of said foothold animal trap;
wherein said stake is configured to be driven into the ground to stabilize said foothold animal trap preventing the animal trap from rocking, shifting or moving in a trap bed when encountered by an animal; and
wherein said second aperture is countersunk.

7. The animal trap of claim 6, wherein said stake includes a head, said head received in said countersink formed in said second aperture.

* * * * *

UNITED STATES PATENT AND TRADEMARK OFFICE
CERTIFICATE OF CORRECTION

PATENT NO. : 9,644,336 B2  
APPLICATION NO. : 14/716468  
DATED : May 9, 2017  
INVENTOR(S) : Travis Michael McClard Page 1 of 1

It is certified that error appears in the above-identified patent and that said Letters Patent is hereby corrected as shown below:

In the Claims

Column 4, Line 40, delete "sad" and substitute --said--.

Column 4, Line 41, delete "dosed" and substitute --closed--.

Column 6, Line 1, delete "dosed" and substitute --closed--.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*